United States Patent [19]
Garney

[11] Patent Number: 5,822,784
[45] Date of Patent: Oct. 13, 1998

[54] MECHANISM SUPPORTING EXECUTE IN PLACE READ ONLY MEMORY APPLICATIONS LOCATED ON REMOVABLE COMPUTER CARDS

[75] Inventor: John I. Garney, Aloha, Oreg.

[73] Assignee: Intel Corporation, Santa Clara, Calif.

[21] Appl. No.: 680,294

[22] Filed: Jul. 12, 1996

Related U.S. Application Data

[63] Continuation of Ser. No. 389,076, Feb. 14, 1995, abandoned, which is a continuation of Ser. No. 34,575, Mar. 19, 1993, abandoned.

[51] Int. Cl.$^6$ ........................................... G06F 12/00
[52] U.S. Cl. ..................... 711/208; 711/165; 711/115
[58] Field of Search .................. 395/416, 418, 395/492; 711/208, 165, 115

[56] References Cited

U.S. PATENT DOCUMENTS

| | | | |
|---|---|---|---|
| 4,443,847 | 4/1984 | Bradley et al. | 711/5 |
| 4,485,457 | 11/1984 | Balaska et al. | 711/5 |
| 4,532,590 | 7/1985 | Wallach et al. | 711/212 |
| 4,758,946 | 7/1988 | Shar et al. | 711/89 |
| 4,758,951 | 7/1988 | Sznyter, III | 711/206 |
| 4,831,522 | 5/1989 | Henderson et al. | 711/2 |
| 4,982,360 | 1/1991 | Johnson et al. | 711/108 |
| 5,109,521 | 4/1992 | Culley | 711/165 |
| 5,182,805 | 1/1993 | Campbell | 711/163 |
| 5,592,625 | 1/1997 | Sandberg | 711/147 |
| 5,630,097 | 5/1997 | Orbits et al. | 711/165 |

OTHER PUBLICATIONS

Stevens; Advanced Programming in the UNIX Environment; pp. 188–189, 1992.

John L. Hennessy, Computer Architecture A Quantitative Approach, 1990, Cl8.5–pp. 433–449.

"Subnotebook modem runs over 15 hours" *COMDEX Daily*, Tuesday, Nov. 17, 1992, p. 22.

*Primary Examiner*—Parshotam S. Lall
*Assistant Examiner*—Kenneth R. Coulter
*Attorney, Agent, or Firm*—Blakely, Sokoloff, Taylor & Zafman

[57] ABSTRACT

A program stored within an application memory storage area of a removable system resource has a more than one step and at least one of the steps requires a datum be written to a portion of the application storage area. The program is executed from the removable resource. A page table is built which has one page entry per page of the program. A given page entry maps a physical address for the page corresponding to the page entry to a virtual address for the corresponding page. Each page entry of the page table is marked to indicate that the page corresponding to the page entry has a read-only status. The program is then executed step-by-step. When the step requiring the datum to be written to the application storage area occurs, a faulting page is determined. The faulting page is the page that contains the portion of the application storage area to which the datum is to be written. The faulting page is copied to a writable area of system memory and the page entry corresponding to the faulting page is updated so that it points to the copy of the faulting page and indicates that the faulting page has a "read/write" status. The step requiring the datum to be written to the portion of application storage area is then re-executed and the datum is written to the copy of the faulting page in the writable area of system memory.

21 Claims, 9 Drawing Sheets

| PAGE 410 | VIRTUAL ADDRESS 420 | PHYSICAL ADDRESS 430 | ACCESS CODE 440 | OTHER DATA 450 |
|---|---|---|---|---|
| P-1 | VA-1 | PA-1 | AC-1 | OD-1 |
| P-2 | VA-2 | PA-2 | AC-2 | OD-2 |
| P-3 | VA-3 | PA-3 | AC-3 | OD-3 |
| ⋮ | ⋮ | ⋮ | ⋮ | ⋮ |
| P-N | VA-N | PA-N | AC-N | OD-N |

PAGE TABLE
400

MECHANISM SUPPORTING EXECUTE IN PLACE READ ONLY MEMORY APPLICATIONS LOCATED ON REMOVABLE COMPUTER CARDS

This is a Continuation Application of application Ser. No. 08/389,076, filed Feb. 14, 1995, now abandoned, which is a continuation of Ser. No. 08/034,575, filed Mar. 19.1993 now abandoned.

BACKGROUND OF THE INVENTION

1. Field of the Invention

The present invention pertains to the field of computer systems. Specifically, the present invention relates to computer systems supporting an interface to removable system resources and the execution of processes therefrom.

2. Art Background

It is becoming increasingly important to design and build computer systems that can execute computer programs from removable system resources when the resources are coupled to the computer system. These removable system resources include expansion memory boards, parallel or serial input/output (I/O) ports, read only memory (ROM) or flash memory expansion boards, computer network interface cards, modem cards, smart cards, or other removable system resources or special feature mechanisms.

Such removable system resources are often implemented in the prior art using removable electronic feature cards adhering to the Personal Computer Memory Card International Association (PCMCIA), Sunnyvale, Calif., Release 2.0 standard. These PCMCIA feature cards generally comprise electronic microcircuits within a thin housing including a detachable multiple conductor interface with which the feature card may be removably inserted into a slot in a computer housing. Once inserted, a feature card is accessible to, and used by, the processor in the computer system. The use of feature cards allows a computer user to select specific features or resources from a variety of feature cards offered by a computer vendor. In this way, the computer user achieves the desired level of functionality without being required to purchase unnecessary resources or computer system capabilities. The overall cost of the computer system for a specific application is thereby optimized. The use of removable feature cards is particularly significant for portable computers or lap top computers where space constraints increase the need for system resource optimization. The design and use of hardware devices under the PCMCIA standard are well known in the art. It will be apparent to those skilled in the art that other implementations of removable system resources are possible.

Virtually all computer systems operate with some sort of operating system or software processing logic. The use of an operating system (OS) in a computer system is well-known in the art. The operating system, sometimes called the executive, is software which is responsible for controlling the allocation and usage of hardware resources such as memory, central processing unit (CPU) time, disk space and peripheral devices. The operating system is the foundation upon which applications, such as word-processing and spreadsheet programs, are built. Popular operating systems include MS-DOS®, Windows®, the Macintosh OS®, OS/2® and UNIX®.

Many computer systems use a disk storage model. In the disk storage paradigm, a copy of an application program and its relocation information is stored on a mass storage device (such as a hard disk or a floppy disk). When the application is to be executed ("run"), the relocation data is used to modify the copy of the application program thereby yielding an executable copy of the application program. The executable copy is copied into system RAM before control is transferred to an executor. The disk storage model is commonly used because, when compared to system RAM, a mass storage device can typically store a large number of applications far more inexpensively than can the system RAM. However, the system RAM can usually be accessed by the computer system more quickly than can the mass storage device. Thus, many applications can be stored on the mass storage device, and an individual application can be accessed (and hence executed) quickly, once it has been copied into system memory. Still, the disk storage model is wasteful because it generally means that two copies of the application program must exist in the system when an application is executing. First, there is the executable copy residing in system RAM. Then, second, there is also the copy that resides on the mass storage device and is used only as a starting point to produce the executable copy.

It is possible for removable cards, such as PCMCIA cards, to have nonvolatile memory that can be accessed faster than mass storage memory. In fact, the feature card memory can typically be accessed about as quickly as can the system RAM. Therefore, in systems with removable feature cards, it is desirable to depart from the mass storage paradigm, by storing, accessing and executing applications directly from the nonvolatile memory of a feature card. In this way, the system need only have one copy of the application. Furthermore, the application can begin execution more quickly than under the mass storage paradigm because the steps of modifying and copying the application before execution are avoided.

The technique of storing an application in the nonvolatile memory of a removable feature card and then executing the application directly from the nonvolatile memory is called "execute in place" (XIP). For PCMCIA cards, at least two XIP approaches have been used with limited success. Each approach uses a feature available in at least some members of the Intel 80×86 family of microprocessors. The first approach uses expanded memory and the second approach uses protected mode. In order to understand the prior art approaches, it is necessary to understand techniques employed by the 80×86 microprocessors.

Virtual memory is a technique which is well known in the art. Virtual memory allows an application to access a large uniform primary memory, which in reality is smaller, more fragmented, and/or partially simulated by secondary storage such as a hard disk. Applications access memory through virtual addresses, which are translated (mapped) by special hardware onto physical addresses. Paging and segmentation are two common implementations of virtual memory.

In segmentation, a "segment" is a portion of a program that, when compiled, occupies a contiguous address space and which is usually position independent (i.e. can be loaded anywhere into memory). With Intel based microcomputers, a native-mode segment is a logical reference to a 64-Kilobyte (KB) contiguous portion of RAM in which the individual bytes are accessed by means of an offset value. Collectively, the segment-offset values reference a single physical location in RAM.

A "page" is a fixed-size block of memory. When used in the context of a paging memory system, a page is a block of memory whose physical address can be changed via mapping hardware. A page is usually associated with virtual memory hardware, although the 16 KB blocks mapped using the Expanded Memory Specification (EMS) are also called pages. In the memory management unit (MMU) of the 80386 and 80486 processors, a page is 4 KB. In Motorola systems, the page size is configurable between 256 bytes and 32 KB.

The Expanded Memory Specification is a description of a technique for adding memory to IBM PC systems. EMS is also called LIM EMS because it was developed by a Lotus/Intel/Microsoft collaboration. The "real mode" architecture of Intel 80×86 CPUs limits the maximum amount of usable memory in a computer system to 1 Megabyte (MB). The IBM PC design tightens that restriction to approximately 640 KB. The EMS bypasses these limits by supporting memory boards containing a number of 16 KB banks of RAM that can be enabled or disabled by software. The memory on these boards is not normally addressable by the CPU, but each bank (or page) can be mapped into the address space of the processor. 80386 and 80486 microprocessors can simulate EMS hardware with their on-chip memory managers and special software. EMS can be simulated on 8086/8088 or 80286 machines as well, but the performance is poor.

On IBM PCs and compatible computers, expanded memory is a type of physical memory, up to 8 MB, that can be added to machines based on the Intel 8086/8088 microprocessor or to machines with 80286/80386/80486 microprocessors running MS-DOS® in real (8086-emulation) mode. The use of expanded memory is defined by the Expanded Memory Specification (EMS). Because it represents memory that is not normally accessible to programs running under MS-DOS®, expanded memory requires an interface called the Expanded Memory Manager (EMM), which maps pages (blocks) of bytes from expanded memory onto reserved areas called "page frames" in an accessible memory area. Only EMS-compatible software can make use of expanded memory.

The Expanded Memory Manger is a device driver that implements the software portion of the Expanded Memory Specification (EMS). Although EMS systems typically require additional hardware, managers written for the Intel 80386 and 80486 processors can use the advanced features of these chips to simulate EMS by using extended memory.

In the first approach to XIP for PCMCIA cards, the 16 KB frames of the EMS are used to address typically up to 64 KB of a program residing on a PCMCIA card. The application must be separated into four (or fewer) 16 KB windows. If the application is greater than 64 KB, it must control the access to multiple 64 KB memory areas, with each memory area accessed by no more than four 16 KB frames.

This approach has been implemented, for example, by NEC in an ultra-light mobile computer system. However, it is a very expensive and time consuming method to implement. This is because existing applications must be practically rewritten from scratch to divide them into 16 KB pieces for the separate pages. During this process, care must be taken to ensure that no instruction strings cross a 16 KB page boundary. Therefore, surrounding logic must be added to segregate the pages into discrete 16 KB blocks. Furthermore, whenever a transition is made from one frame to another, logic must be added to the code to ensure that the page to which control will be transferred is correctly addressable by the processor.

The other way to provide XIP for removable system resources is to use the protected mode of extended memory. Extended memory is system memory beyond 1 MB in computers based on the Intel 80286/386/486 microprocessors. This memory is accessible only when the processor is operating in protected mode (or in virtual real mode on the 386/486). Extended memory is not typically available to MS-DOS® programs. However, it is available to OS/2® programs and can be made available to MS-DOS® programs by the use of software that temporarily places the processor into protected mode or by the use of 386/486 features to re-map portions of extended memory into conventional memory based on the EMS conventions.

The extended memory specification is a specification developed by Lotus, Intel, Microsoft and AST Research that defines a software interface that allows real-mode applications to use extended memory and certain areas of conventional memory not managed by MS-DOS®. The management of this additional memory is provided by an installable device driver, the Expanded Memory Manager (EMM). This driver is provided by Microsoft as the file HIMEM.SYS, by Quarterdeck Office Systems as QEMM386.SYS, and by Qualitas as 386MAX.SYS (the latter two require at least a 386-based PC). The application must use the driver in order to take advantage of the additional memory; the presence of the driver alone does not make this additional memory available.

Real mode is the native or default operating mode in IBM and other computers based on the Intel 80×86 family of microprocessors. It is the only operating mode supported by MS-DOS®. Real mode refers to the processor and the way it handles memory, but it can be characterized as providing the user with a single-tasking (one-program-at-a-time) working environment in which programs may freely access system memory and input/output devices. Real mode is one of two different modes designed into Intel 80286, 80386 and i486 microprocessors. Unlike the more versatile protected mode, real mode does not offer features for memory management and memory protection (two important ingredients in the multitasking environment supported by the OS/2® operating system).

Protected mode is an operating mode of the Intel 80286 and higher microprocessors that supports larger address spaces and more advanced features than real mode. When started in protected mode, these CPUs provide hardware support for multitasking, data security and virtual memory. The OS/2® operating system runs in protected mode, as do most versions of UNIX® for these microprocessors.

Very few applications are written to operate in protected mode. Therefore, if the protected mode approach to removable resource XIP is to be implemented, existing applications must be modified to operate in the protected mode. The task of translating a program which operates in real mode to one which operates in protected mode is less onerous than modifying the application to operate in expanded memory. However the conversion of real mode applications to operate in protected mode is not trivial.

Thus, a better means for executing programs from read only memory of system resources in a computer system is needed.

SUMMARY OF THE INVENTION

A method and apparatus for executing in place a program stored within an application memory storage area of a removable system resource when the program has a more than one step and at least one of the steps requires a datum be written to a portion of the application storage area.

The execution of the application from the removable resource is accomplished by dividing the program into more than one page. A page table is then built. The page table has one page entry per page of the program. A given page entry maps a physical address for the page corresponding to the page entry to a virtual address for the corresponding page. Each page entry of the page table is marked to indicate that the page corresponding to the page entry has a read-only status.

The program is then executed step-by-step. When the step requiring the datum to be written to the application storage area occurs, a faulting page is determined. The faulting page is the page that contains the portion of the application storage area to which the datum is to be written. The faulting page is copied to a writable area of system memory and the page entry corresponding to the faulting page is updated so that it points to the copy of the faulting page and indicates that the faulting page has a "read/write" status. The step requiring the datum to be written to the portion of application storage area is then re-executed and the datum is written to the copy of the faulting page in the writable area of system memory.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and apparatus is disclosed for providing execute in place (XIP) capability to applications stored in a read only memory of a removable system resource. In the following description, for purposes of explanation, specific numbers, materials and configurations are set forth in order to provide a thorough understanding of the present invention. However, it will be apparent to one skilled in the art that the present invention may be practiced without these specific details. In other instances, well known systems are shown in diagrammatic or block diagram form in order not to obscure the present invention unnecessarily.

Figure 1:
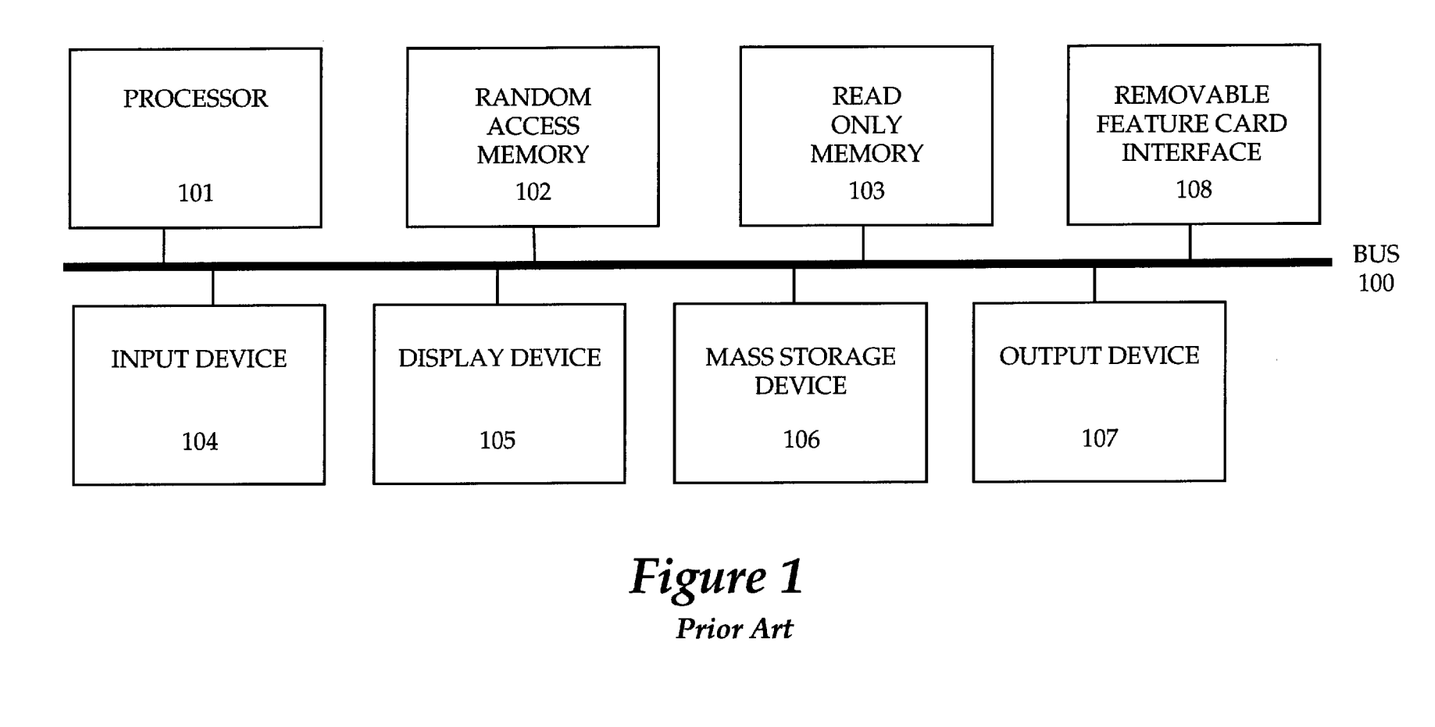
FIG. 1 is a block diagram of the architecture of a computer system in which the present invention operates.

Referring now to FIG. 1, a block diagram of a typical computer system in which the present invention operates is illustrated. It will be apparent to those of ordinary skill in the art, however, that alternative computer system architectures may be employed. In general, such computer systems as illustrated by FIG. 1 comprise a bus 100 for communicating information, a processor 101 coupled with the bus 100 for processing information, a mass storage device 106 such as a magnetic disk and disk drive coupled with the bus 100 for storing information and instructions, a removable electronic feature card interface 108 for electrically removably coupling an electronic circuit card to bus 100, and a random access memory device 102 coupled with the bus 100 for storing information and instructions for processor 101. The processing logic of the present invention is typically stored in a device such as random access memory 102 and executed therefrom by processor 101.

In addition, a typical computer system may optionally include other system resources including a read only memory device 103 coupled with the bus 100, an input device 104 such as an alphanumeric input device or a cursor control device coupled to the bus 100 for communicating information and command selections to the processor 101, a display device 105 such as a video display terminal or a liquid crystal display device coupled to the bus 100 for displaying information to a computer user and an output device 107 such as a printer or facsimile apparatus coupled to the bus 100 for communicating information to a destination external to the computer system.

Removable feature cards which may be removably inserted into interface 108 generally comprise electronic microcircuits within a thin housing including a detachable multiple connector interface with which the feature card may be removably inserted into a slot in a computer system housing. In one embodiment, the feature cards and feature card interface 108 used with the present invention adhere to the PCMCIA release 2.0 standard for electronic feature cards. Feature cards of this form are well known to those of ordinary skill in the art.

Figure 2:
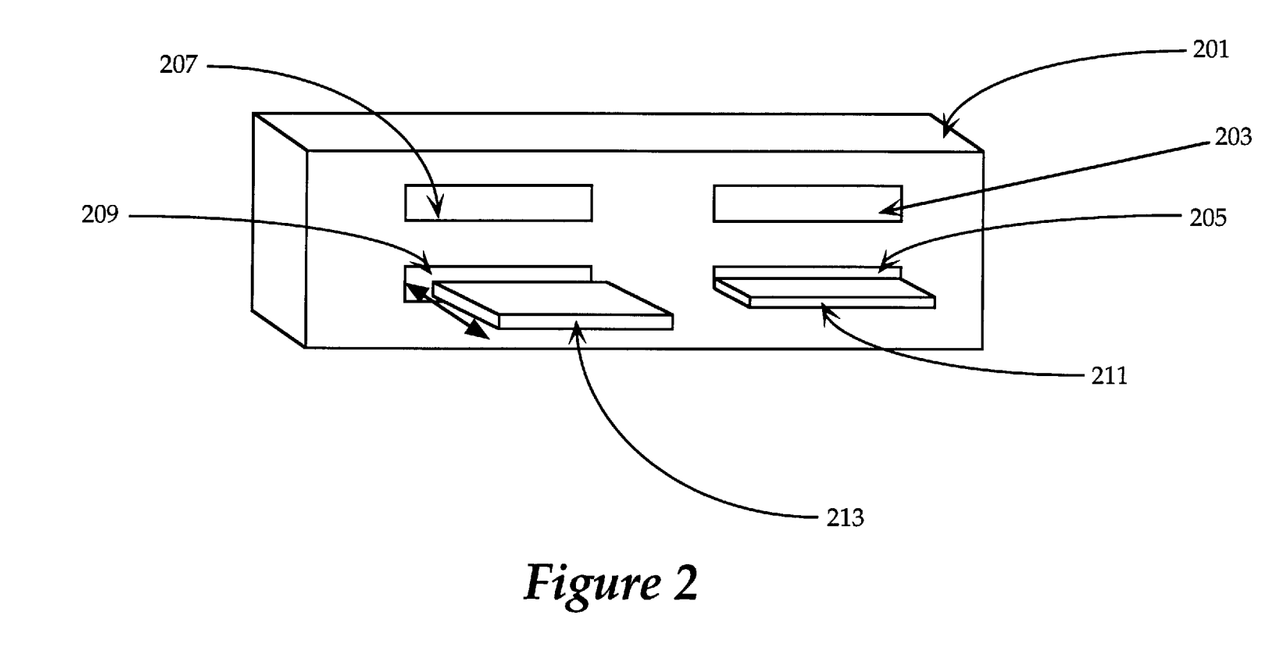
FIG. 2 is an example of a computer housing containing a plurality of feature card insertion slots.

Referring now to FIG. 2, an illustration of a computer system housing having a plurality of feature card interfaces (203, 205, 207, and 209) is illustrated. As shown, feature cards 211 and 213 may be removably inserted and thereby electrically coupled to an interface 108 within the computer system. This feature card structure facilitates the convenient insertion and/or removal of feature cards during the course of a computing session.

Figure 3:
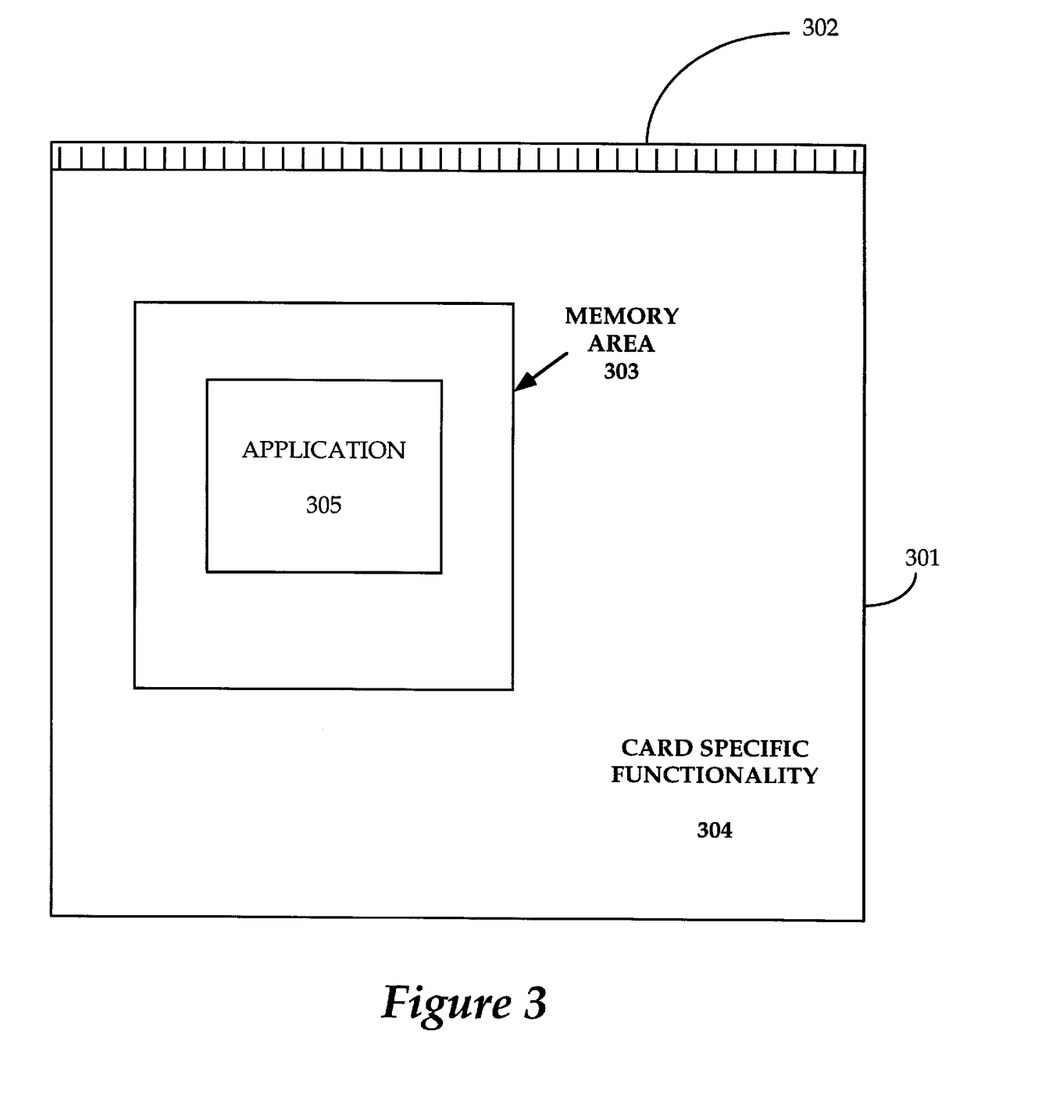
FIG. 3 is a block diagram of the content of an electronic removable feature card.

Referring now to FIG. 3, the structure of a typical feature card 301 is illustrated. Feature card 301 includes an interface 302 with which the feature card 301 may be removably electrically coupled to a computer system. Feature card 301 also includes a card memory area 303. Card memory area 303 stores an application 305 to be executed from the card. Optionally, feature card 301 can also include card specific functionality area 304 which provides card specific functionality (e.g. mass storage memory).

Prior art implementations of execute in place (XIP) applications such as application 305 required that an existing application be rewritten to meet constraints placed upon the application by the XIP implementation. The remarkable thing about XIP application 305 is that the present invention permits existing applications which were not designed to be XIP applications to become XIP applications with no modification or with only slight modifications that are trivial and easily automated.

It will be obvious to one of ordinary skill in the art that the teachings of the present invention are easily extensible to permit more than one XIP application 305 to be stored in card memory area 303. Furthermore, it will be obvious that the present invention will permit a system to use, in a conventional manner, feature cards which do not have an XIP application 305 stored in card memory area 303.

Moreover, while the card memory area 303 will be referred to herein as read only memory (ROM), it will be obvious to one of ordinary skill in the art that card memory area 303 need not be ROM in the technical sense that ROM has come to mean. That is to say that, with respect to the present invention, the important feature of card memory area 303 is that it be nonvolatile memory that can be accessed relatively quickly. For example, card memory area 303 could be implemented with flash memory. While flash memory can be written to, and therefore is not technically read only memory, flash memory is nonvolatile memory that can be accessed relatively quickly.

Figure 4:
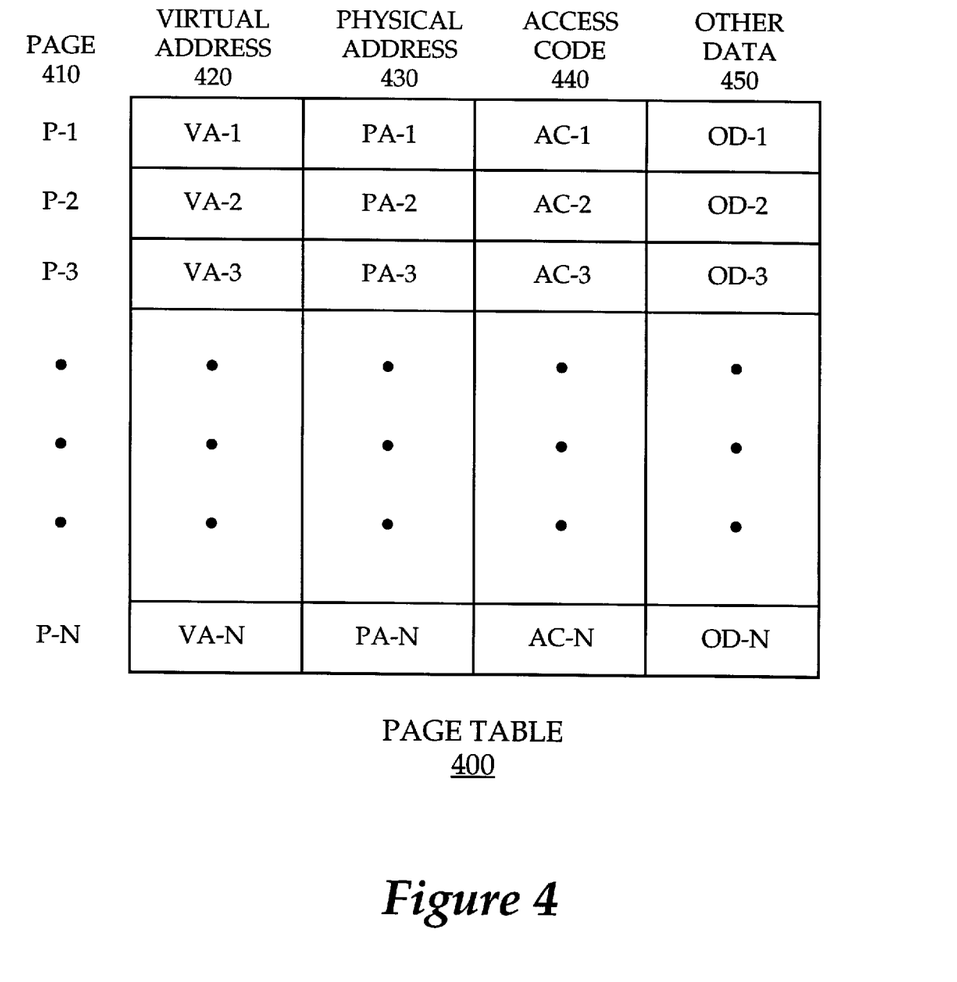
FIG. 4 illustrates the content of a page table.

Referring now to FIG. 4, page table 400 is illustrated. Page table 400 is stored in system memory RAM area 102 and describes N page entries 410, where N is a positive integer. The page entries 410 correspond to pages P-1 to P-N. Each page (p-1 to P-N) corresponds to one page of the virtual memory representation of a given XIP application for a feature card. Thus, there would be 160 pages in the case of a 640 KB XIP application that was divided into 4 KB sized pages (i.e. N=160).

There is one set of fields per page entry of page table 400. A set of fields corresponding to one page entry includes the fields: virtual address 420, physical address 430, access code 440 and other data field 450. The way that the present invention manipulates the contents of these fields will be described below in association with FIGS. 5–9. The fields virtual address 420 and physical address 430, respectively, contain the virtual and physical address of a page. The concepts of virtual and physical address are well known to those of ordinary skill in the art. It is also well known in the art that virtual address 420 need not be stored in table 400, but may be determinable by the position of the entry in the table. In one embodiment of the present invention, access code field 440 is a Boolean field with values corresponding to a page having an access state of "read only" or "read/write". The other data field 450, is a field that contains other data concerning the page in question. An example of data that could be stored in other data field 450 would data providing a history of accesses made to the page. This type of information is commonly used in a virtual memory environment but is not pertinent to the present invention.

The contents of the virtual address field 420 are designated VA-1 to VA-N and correspond respectively to pages P-1 to P-N. Similarly, the contents of the physical address field 430 and access code 440 are designated PA-1 to PA-N and AC-1 to AC-N, respectively, and correspond to pages P-1 to P-N. Finally, the contents of the other data field 450 are designated OD-1 to OD-N and also correspond to pages P-1 to P-N. Thus, for example, Page P-3 would have a virtual address of VA-3, a physical address of PA-3, an access code of AC-3 and an other data value of OD-3.

Figure 5:
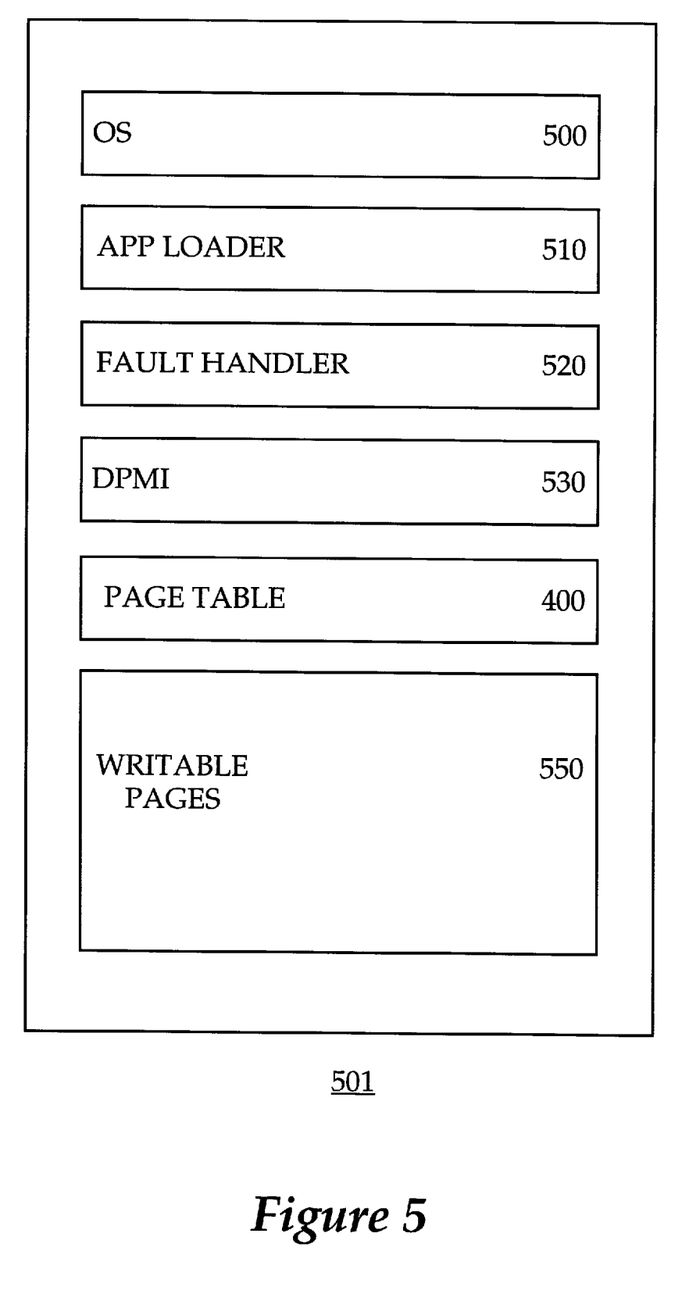
FIG. 5 illustrates the content of computer system memory.

Referring now to FIG. 5, a portion of computer system memory 501 residing within random access memory 102 is illustrated. Computer system memory portion 501 comprises operating system 500, application loader 510, fault handler 520, DOS protected mode interface (DPMI) 530, page table 400 and writable pages area 550.

In one embodiment of the present invention, operating system 500 is the DOS operating system. DOS and other operating systems are well known in the art. Although the present invention can be practiced using operating systems other than DOS, DOS is more restrictive than most operating systems which would commonly be used. Since a DOS implementation is more restrictive than most, based on the following disclosure, implementation of the present invention in other operating system environments will be obvious to one of ordinary skill in the art. Therefore, an embodiment of the present invention which uses the DOS operating system environment will be presented throughout the rest of the disclosure.

Application loader 510 prepares the computer system to execute an XIP application stored on a removable resource. The processing logic of application loader 510 is presented below in conjunction with FIG. 8.

DPMI 530 permits the XIP application to be executed by the processor when the computer system is placed in "virtual real" mode. Virtual real mode (also called virtual 8086 mode or V86 mode) is a feature of the Intel 80386 (SX and DX) and i486 microprocessors that allows the microprocessor to emulate several 8086 environments (real mode environments) simultaneously. The microprocessor provides a set of virtual registers and virtual memory space for each virtual 8086 environment. Controlling software, usually an operating system or operating environment, is required for the microprocessor to run in virtual real mode. The software controls the external interface (e.g. input and output, exception handling and interrupts) to each virtual 8086 environment. An application running in a virtual 8086 environment on the 80386 or i486 microprocessor is completely protected from other virtual 8086 environments in the system and behaves as if has control of the entire system.

Any faults which occur during the execution of an XIP application will cause DPMI 530 to generate a fault interrupt. Upon sensing the fault interrupt, fault handler 520 will execute and attempt to recover from the fault condition, thereby permitting the XIP application to continue. Fault handlers, are well known in the art. However, fault handler 530 has been modified to handle a special fault condition of the present invention. This special fault condition occurs when the processor tries to write to a page of the XIP application which resides on the read only memory section of the removable resource. In the mass storage paradigm, for reasons well known to one of ordinary skill in the art, it is quite common for a processor to write data to the portion of RAM from which the application is executing. However, since the present invention permits an application which was written to execute using the mass storage paradigm to execute from read only memory, an error condition occurs when there is an attempt to write to the read only memory.

Page table 400 provides a mapping between the physical pages of the XIP application stored on the read only memory section of the removable system resource and the virtual address space used by the processor when it executes the XIP application in virtual real mode. In the present invention, every page in the page table is originally marked by application loader 510 with a "read-only" status in the access code field of page table 400. Then, if the processor attempts to write to a page having a "read-only" status, DPMI 530 will generate a fault interrupt. The fault interrupt causes fault handler 520 to attempt to rectify the condition causing the fault. In the case where the cause of the fault is the attempt to write to a page of the XIP application having "read-only" status, the fault handler will copy the faulting page to writable pages area 550 of RAM 102. The fault handler will then update the page entry of page table 400 for the faulting page. First, the virtual address of the faulting page is mapped to the physical address of the copy of the faulting page which is resident in the writable pages area of RAM 102. Then, the access code field for the page is updated to reflect the "read-write" access status of the faulting page copy. The modification made to fault handler 530 to handle this special fault condition will be explained below in greater detail in connection with FIGS. 6–9.

Figure 6:
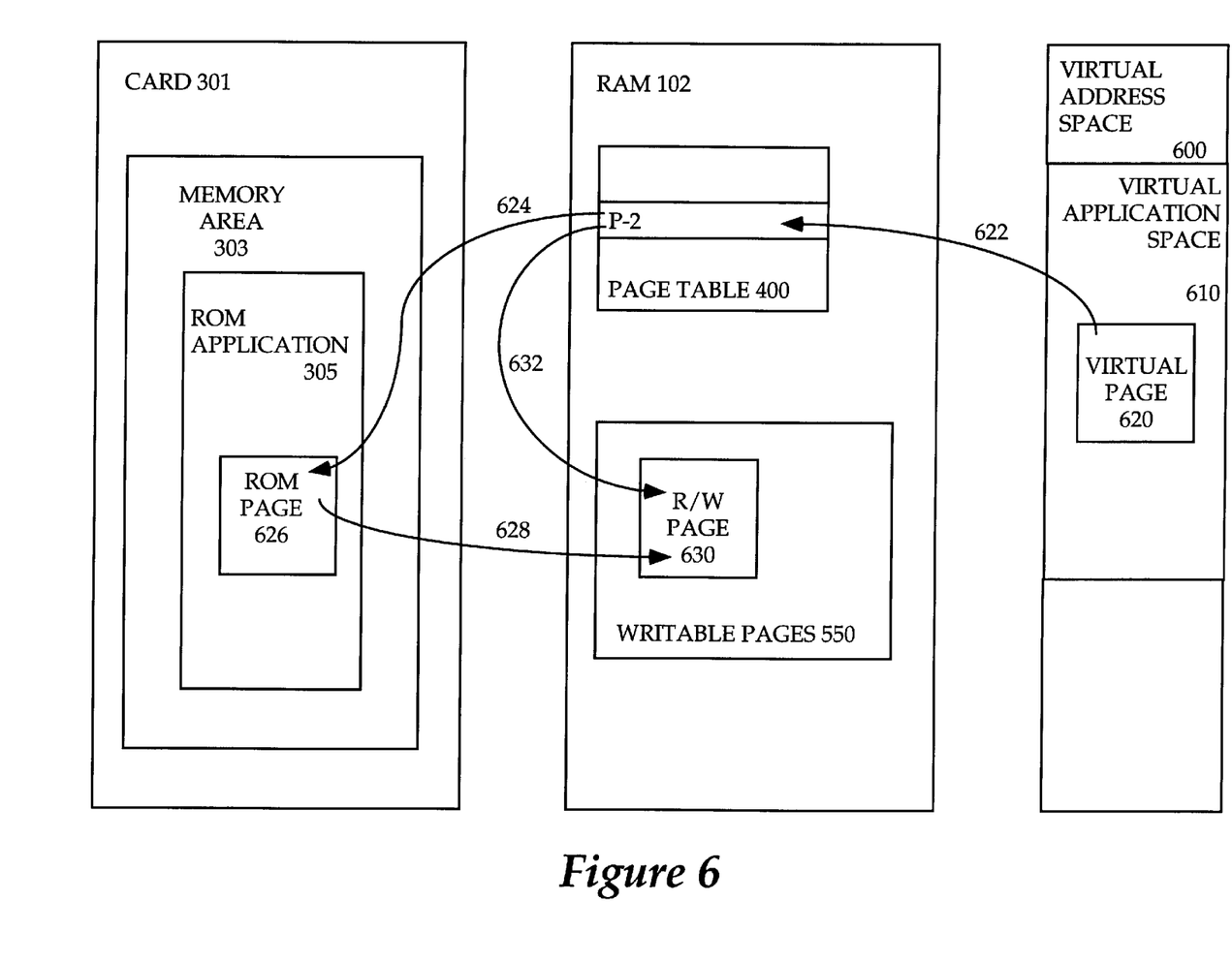
FIG. 6 illustrates the content of computer system memory as related to the content of the feature card memory and the virtual address space.

Referring now to FIG. 6, fault handling during an XIP application write fault is demonstrated. In FIG. 6, virtual address space 600 represents the entire range of possible virtual addresses which a processor may address when running in virtual mode. Virtual application space 610 represents the range of virtual addresses which the processor will be able to address for a given XIP application.

ROM application 305 is the place in memory area 303 of card 301 where the XIP application is physically stored.

Virtual application space 610 has the same address range size as the physical address space of ROM application 305. Page table 400 provides the mapping between virtual addresses in virtual application space 610 and physical addresses of ROM application 305.

Page P-2 is an example of a page which has an entry in page table 400. While the application is executing, the processor will address the pages using the virtual addresses. In the course of processing, the processor can attempt to write to a virtual address contained within the virtual address range of virtual page 620. Arrow 622 illustrates that virtual page 620 corresponds to page P-2 of page table 400.

Initially, as illustrated by arrow 624, the page P-2 entry of page table 400 points to ROM page 626 of ROM application 305 on card 301. Also initially, the page table entry indicates that the ROM page 626 has a "read-only" status. Therefore, the first attempt to write to ROM page 626 will cause the DPMI to generate a write fault interrupt. The interrupt, in turn, will cause the fault handler to execute as illustrated in detail in the flow chart of FIG. 9.

Referring again to FIG. 6, upon sensing the write fault condition, the fault handler will determine that the write fault was caused by the attempt to write to the ROM page 626 version of page P-2 stored on card 301. As indicated by arrow 628, the fault handler will then copy ROM page 626 to read/write (R/W) page 630 of writable pages area 550 of RAM 102.

Finally, the fault handler will update the P-2 page entry of page table 400. First, as illustrated by arrow 632, rather than point to ROM page 626, the physical address field for page P-2 will be modified to point to the copy of ROM page 626 stored in R/W page 630. Then, the access code status of page P-2 will be set to "read/write". Control of the computer system will then return from the fault handler to the application where execution of the step causing the write fault will be attempted again. This time, and every subsequent time, because the page table 400 will point to the writable R/W page 630 and show that the page has "read/write" status, a write to page P-2 will not cause a fault and the execution of the XIP application will continue.

It will be apparent to one of ordinary skill in the art that only pages of the XIP application which need to be written to will be copied into writable pages area 550. In a worst case scenario, every page of ROM application 305 will be copied into writable pages area 550. From a memory utilization standpoint, the worst case scenario of the present invention is as wasteful as that of the mass storage paradigm. However, the worst case will be an exceptional case. In a typical XIP situation, only a small part of the application will need to be copied to the writable pages area 550. Furthermore, the XIP program will begin execution quickly because there will be no need to copy the whole application into RAM before the program can begin execution. Moreover, because pages will only be copied into RAM on an ad hoc basis and because only one page is copied into RAM at a time, even if the entire application is ultimately copied into RAM, the copying process will be distributed across the total processing time for the application and hence, will not be noticeable by the user.

Figure 7:
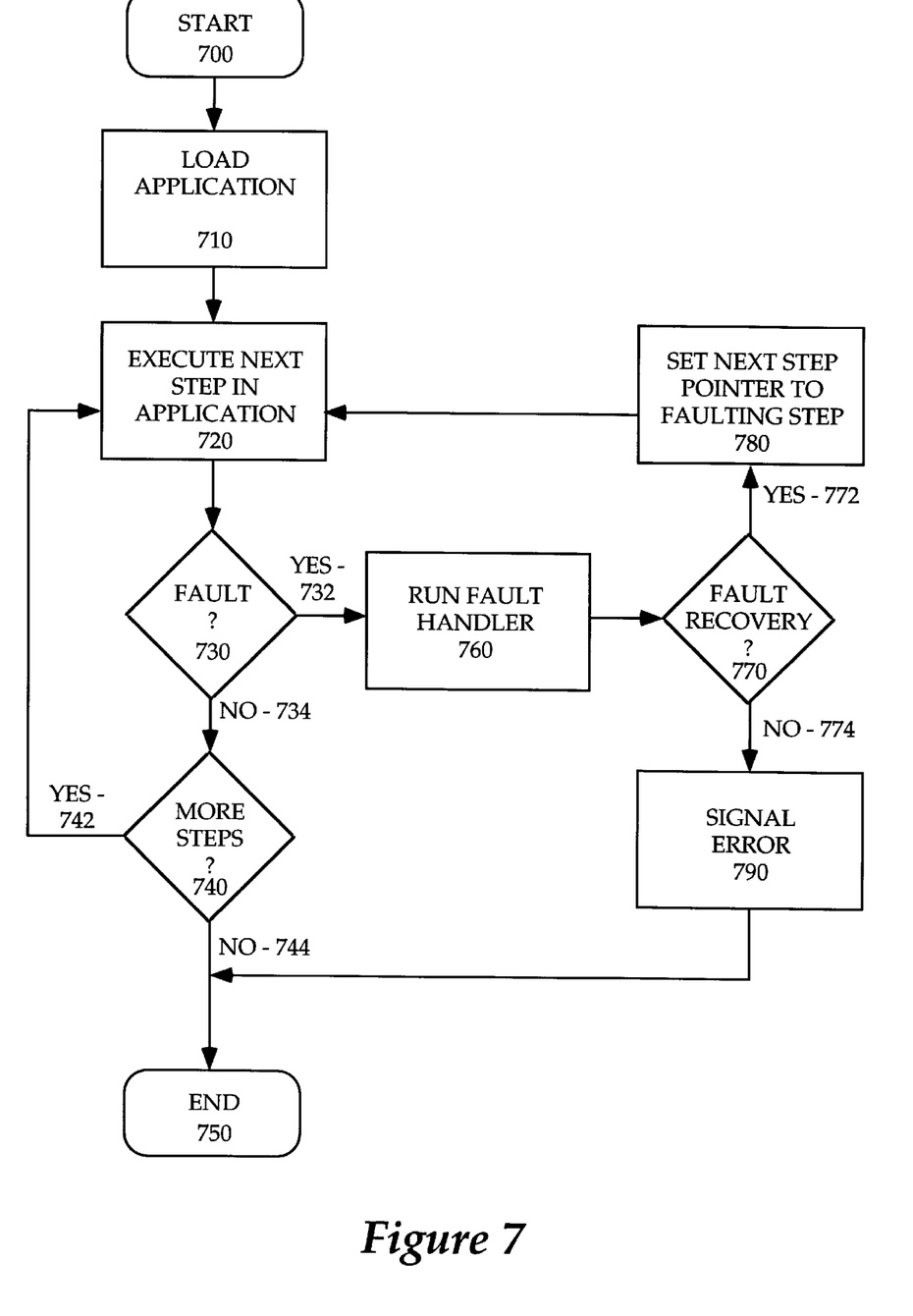
FIGS. 7, 8, 9 are flow charts illustrating the processing logic of one embodiment of the present invention.
Figure 8:
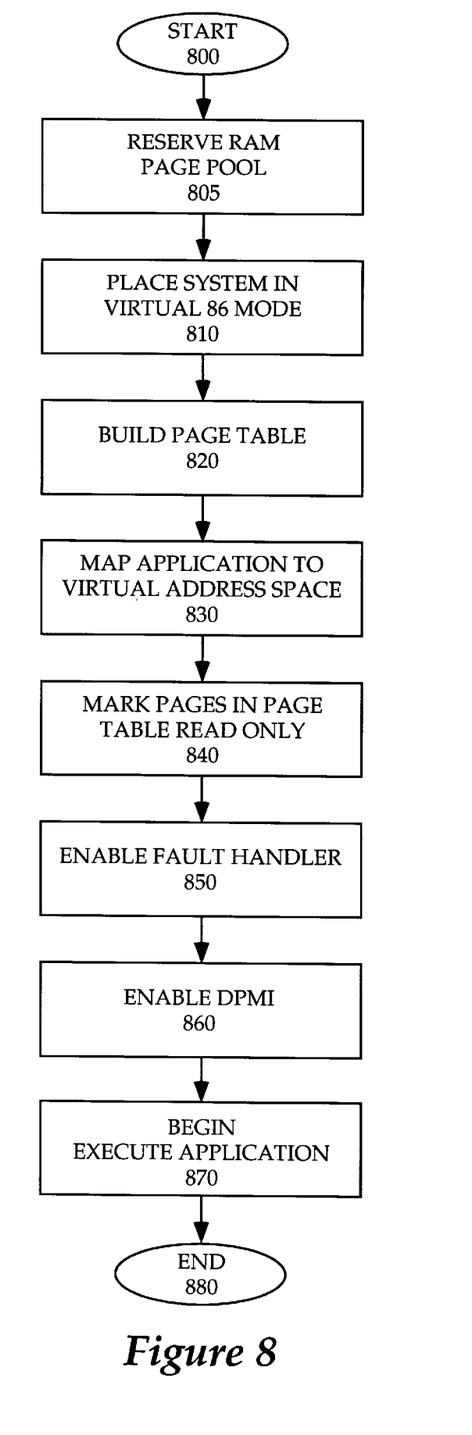
Figure 9:
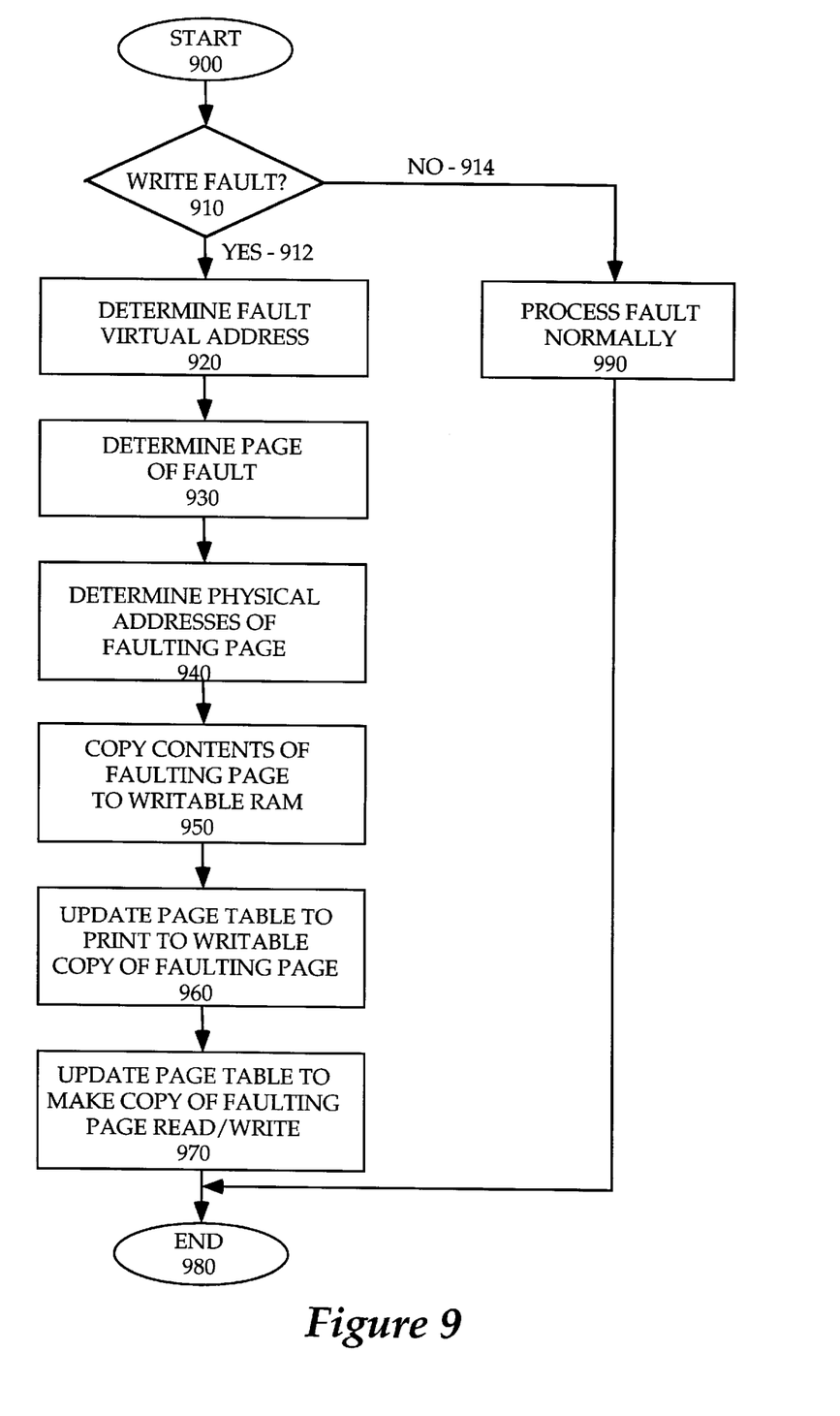

Referring now to FIGS. 7–9, flowcharts of the processing logic used by one embodiment of the present invention are illustrated. It will be apparent to those skilled in the art that the processing logic described herein may be executed by processor 101 of the computer system.

Referring now to FIG. 7, a flow chart is depicted which illustrates the sequence of events that occur when executing an XIP application from a removable system resource. This sequence begins at initial bubble 700 and continues to process block 710 where, as will be explained below in greater detail in conjunction with FIG. 8, the desired XIP application is loaded. After being loaded, the application can be executed step-by-step until it completes. Once the application has been loaded, the first step of the application is executed in processing block 720. A test is then made in decision block 730 to determine whether the executed step has resulted in a fault. If no fault occurred, then processing path 734 is taken to decision block 740 where a test is made to determine whether there are more steps to be executed in the application.

If there are more steps to be executed, then processing path 742 is taken to processing block 720 where the next step in the application is executed. Referring again to decision block 740, when there are no more steps to be executed in the application, processing path 744 is taken to terminal bubble 750 and the application terminates.

Referring again to decision block 730, if a fault occurs as a result of execution of a step in processing block 720, then processing path 732 is taken from decision block 730 to processing block 760. In processing block 760, a fault handler is executed to attempt to recover from the fault. The operation of the fault handler is explained in greater detail below in connection with FIG. 9. The fault handler may or may not be able to correct the condition causing the fault. In decision block 770, a test is made to determine whether the fault handler successfully corrected the fault condition. If the fault handler was unable to correct the fault condition, then processing path 774 is taken to processing block 790 where the non-recoverable fault error is signaled. After signaling the non-recoverable fault error, processing of the XIP application will then terminate at terminal bubble 750.

Referring again to decision block 770, if the fault handler has been able to recover from the faulting condition, then processing path 772 is taken to processing block 780 where the next step pointer is set to the faulting step so that the faulting step can be executed again in processing block 720 (this time the step will execute without a fault). Typically, all the testing and branching for fault conditions is performed in hardware by the processor.

Referring now to FIG. 8, a flow chart describing the XIP application loading process is illustrated. The flow chart corresponds to the processing which would occur in process block 710 of FIG. 7. In FIG. 8, XIP application loading begins in initial bubble 800 and proceeds sequentially through to terminal bubble 880.

In processing block 805, pages of RAM are reserved for future page faults. Then, in processing block 810, the application loader places the computer system in virtual real mode. The application loader also determines the application to be loaded and sets up a mapping for the application memory image on the removable feature card. Next, in processing block 820, a page table having the structure of page table 400 (FIG. 4) is built for the XIP application to be executed. Once the page table has been built, then a mapping can be made between the application residing in the read only memory of the removable feature card and the virtual address space which will be used when the application is executing. This mapping is performed in processing block 830 of FIG. 8.

In processing block 840, each page in the page table is marked "read-only". This is done by setting the access code in the page table to indicate the read-only status of the pages. Then, in processing block 850, the fault handler (described in greater detail below in connection with FIG. 9), is enabled by the application loader. The fault handler permits the XIP application to recover when a step of the application is executed which attempts to write to a page that has a "read only" status.

Next, in processing block 860 of FIG. 8, a DOS protected memory interface (DPMI) is enabled to permit the execution of the application in the virtual real mode. A DPMI is a software tool which is available commercially and is well known in the art. Whenever the DPMI encounters a fault, it generates an interrupt signal that causes the fault handler to attempt to recover from the fault condition. Finally, any other steps which are necessary to prepare the XIP application to execute are performed in processing block 870 before the application loader terminates.

Referring now to FIG. 9, a flow chart for the fault handler of the present invention is depicted. The fault handler executes whenever a fault condition occurs during execution of the XIP application. Faults can occur for many reasons. Fault handlers which respond to common faults are well known in the art. The fault handler of FIG. 9 has been modified to handle a fault caused by a write attempt by the present invention to a portion of an XIP application which has a "read-only" status.

Processing of the fault handler begins at initial bubble 900. In processing block 910, a test is made to determine whether the fault which was signaled is a write fault caused by attempting to write to a portion of the XIP application which has a "read-only" status. If the fault is not this type of fault, then processing path 914 is taken to processing block 990 where the fault is processed as a fault would normally be processed. As stated above, the types of faults which would typically be encountered and the methods which would be employed by the fault handler to correct these faults are well known in the art. Therefore processing block 990 need not be discussed in further detail. Once the fault has been processed in processing block 990, the fault handler terminates at terminal bubble 980.

Referring again to decision block 910, if a write fault has occurred that was caused by attempting to write to a portion of the XIP application which has a "read-only" status, then processing path 912 is taken to processing block 920. In processing block 920, the virtual address of the instruction which caused the fault is determined. The faulting instruction virtual address permits the fault handler to determine in processing block 930 the page that contains the faulting instruction. In processing block 940, the page table 400 of FIG. 4 can then be used by the fault handler to provide the physical addresses of the faulting page.

Referring now to processing block 950 of FIG. 9, once the physical address of the faulting page has been ascertained, the contents of the faulting page are copied by the fault handler into writable page RAM area 550 of FIG. 5. The page table 400 is then updated in processing block 960 of FIG. 9 to point to the writable copy of the faulting page rather than to the non-writable page of the removable feature card. Finally, the access code field of the page table entry corresponding to the faulting page is updated to reflect a "read/write" status for the copy of the page, before the fault handler terminates at terminal bubble 980. The faulting page has been copied to the writable page area of RAM, and the page table has been updated to point to the copy and to show that the copy of the page has an access code of read/write. Therefore, when the step is re-executed, it will no longer generate a write fault. Instead, the copy of the page table stored in the writable page 550 section of RAM 501 will be modified by the write.

Thus, a computer system having a method and apparatus for executing in place applications stored on a read only memory area of a removable system resource is described.

While the method of the present invention has been described in terms of its presently preferred and alternate embodiments, those skilled in the art will recognize that the method of the present invention may be practiced with modification and alternation within the spirit and scope of the appended claims. The specifications and drawings are, accordingly, to be regarded in an illustrative rather than a restrictive sense.

I claim:

1. A computer system comprising:

a system memory;

a processor coupled to said system memory;

a removable system resource including a program stored within an application storage area of said removable system resource, said program comprising a plurality of steps, at least one step of said plurality of steps requiring a datum be written to a portion of said application storage area, application loading means for loading an application, for preparing said program to be executed from said removable system resource by dividing said program into a plurality of pages, for building a page table comprising a plurality of page entries, each page entry corresponding to a page of said program and mapping a physical address within said application storage area for said corresponding page to a virtual address for said corresponding page, and for marking each page entry of said page table to indicate that said page corresponding to said page entry has a read-only status;

application execution means for executing said application, for executing said program step-by-step and for detecting a fault after said one step is executed; and fault handling means for handling said fault, for determining a faulting page of said plurality of pages, said faulting page containing said portion of said application storage area to which said datum is to be written, said system memory including a writable area, for copying said faulting page to said writable area of said system memory, and for updating a faulting page entry, corresponding to said faulting page, by modifying said faulting page entry so that said faulting page entry points to said copy of said faulting page and indicates that said faulting page has a "read/write" status, said application execution means then re-executing said step requiring said datum to be written to said portion of application storage area and writing said datum to said copy of said faulting page in said writable area of said system memory.

2. The apparatus as set forth in claim 1 wherein said application loading means comprises:

means for dividing said program into a plurality of pages;

means for building a page table; and means for marking each said page entry of said page table to indicate that said page corresponding to said page entry has a read-only status.

3. The apparatus as set forth in claim 1 wherein said application execution means comprises:

means for executing said program step-by-step;

means for detecting said fault; and means for re-executing said step requiring said datum to be written to said portion of application storage area, said re-executing means writing said datum to said copy of said faulting page in said writable area of said system memory.

4. The apparatus as set forth in claim 1 wherein said fault handling means comprises:
   means for determining said faulting page;
   means for copying said faulting page to said writable area of said system memory; and
   means for updating said faulting page entry of said page table.

5. A computer system comprising:
   a system memory;
   a processor coupled to said system memory;
   a removable system resource including said program stored within an application storage area of said removable system resource, said program comprising a plurality of steps, at least one of said steps requiring a datum be written to a portion of said application storage area;
   dividing means for dividing said program into a plurality of pages;
   building means for building a page table, coupled to said dividing means, said page table comprising a plurality of page entries, each page entry corresponding to a page of said program and mapping a physical address within said application storage area for said corresponding page to a virtual address for said corresponding page;
   marking means for marking each said page entry of said page table to indicate that said page corresponding to said page entry has a read-only status, said marking means coupled to said building means;
   execution means for executing in place said program step-by-step from said application storage area, said execution means coupled to said removable system resource, said system memory and said building means;
   detection means for detecting when said step requiring said datum to be written to said application storage area occurs, said detection means coupled to said execution means;
   determining means for determining a faulting page of said plurality of pages, said faulting page containing said portion of said application storage area to which said datum is to be written and having a read-only status, said determining means coupled to said detection means and said building means;
   copying means for copying said faulting page to a writable area of said system memory, said copying means coupled to said removable system resource, said system memory and said determining means;
   updating means for updating a faulting page entry of said page table, said faulting page entry corresponding to said faulting page, said updating means modifying said faulting page entry so that said faulting page entry points to said copy of said faulting page and indicates that said faulting page has a "read/write" status, said updating means coupled to said building means and said copying means; and
   re-executing means for re-executing said step requiring said datum to be written to said portion of application storage area, said re-executing means coupled to said system memory and said building means, said re-executing means writing said datum to said copy of said faulting page in said writable area of said system memory.

6. The apparatus as set forth in claim 5 wherein the dividing means, building means and marking means are elements of an application loader.

7. The apparatus as set forth in claim 5 wherein the execution means, detection means and re-executing means are elements of a DOS protected mode interface (DPMI), and wherein said detection means generates an interrupt upon detecting said faulting page.

8. The apparatus as set forth in claim 7 wherein the determining means, copying means and updating means are elements of a fault handler, and wherein said fault handler responds to said interrupt generated by said DPMI.

9. A computer system for executing in place a program, said apparatus comprising:
   a system memory,
   a processor coupled to said system memory;
   a removable system resource coupled to said processor, said removable system resource having a program stored within an application storage area of said removable system resource, said program comprising a plurality of steps, at least one of said steps requiring a datum be written to a portion of said application storage area;
   a page maker to divide said program into a plurality of pages;
   a page table builder coupled to said page maker, said page table builder building a page table comprising a plurality of page entries, each page entry corresponding to a page of said program and mapping a physical address within said application storage area for said corresponding page to a virtual address for said corresponding page;
   a page entry marker coupled to said page table builder, said page entry marker marking each said page entry of said page table to indicate that said page corresponding to said page entry has a read-only status;
   a program executor coupled to said removable system resource, said system memory and said page table builder, said program executor executing in place said program step-by-step from said application storage area;
   a write error detector coupled to said program executor, said write error detector detecting when said step requiring said datum to be written to said application storage area occurs;
   a faulting page calculator coupled to said write error detector and said page table builder, said faulting page calculator determining a faulting page of said plurality of pages, said faulting page containing said portion of said application storage area to which said datum is to be written;
   a faulting page copier coupled to said removable system resource, said system memory and said faulting page calculator, said faulting page copier copying said faulting page to a writable area of a system memory;
   a page table entry modifier coupled to said page table builder and said faulting page copier, said page table entry modifier updating a faulting page entry of said page table, said faulting page entry corresponding to said faulting page, said page table entry modifier updating said faulting page entry so that said faulting page entry points to said copy of said faulting page and indicates that said faulting page has a "read/write" status; and
   a program step re-executor coupled to said system memory and said page table builder, said re-executor executing said step requiring said datum to be written to said portion of application storage area and writing said datum to said copy of said faulting page in said writable area of said system memory.

10. The apparatus as set forth in claim 9 wherein the page maker, page table builder and page entry marker are elements of an application loader.

11. The apparatus as set forth in claim 9 wherein the program executor, write error detector and program step re-executor are elements of a DOS protected mode interface (DPMI), and wherein said write error detector generates an interrupt upon detecting a write error.

12. The apparatus as set forth in claim 11 wherein the faulting page calculator, faulting page copier and page table entry modifier are elements of a fault handler, and wherein said fault handler responds to said interrupt generated by said DPMI.

13. A computer system comprising:

a processor;

a system memory coupled to said processor, said system memory having a writable area;

a removable system resource coupled to said processor, said removable system resource having a program stored within an application storage area of said removable system resource, said program comprising a plurality of steps, at least one of said steps requiring a datum be written to a portion of said application storage area;

dividing means for dividing said program into a plurality of pages;

building means for building a page table, coupled to said dividing means, said building means comprising a plurality of page entries, each page entry corresponding to a page of said program and mapping a physical address for said corresponding page to a virtual address for said corresponding page;

marking means for marking each said page entry of said page table to indicate that said page corresponding to said page entry has a read-only status, said marking means coupled to said building means;

execution means for executing said program step-by-step, said execution means coupled to said removable system resource, said system memory and said building means;

detection means for detecting when said step requiring said datum to be written to said application storage area occurs, said detection means coupled to said execution means;

determining means for determining a faulting page of said plurality of pages, said faulting page containing said portion of said application storage area to which said datum is to be written, said determining means coupled to said detection means and said building means;

copying means for copying said faulting page to said writable area of said system memory, said copying means coupled to said removable system resource, said system memory and said determining means;

updating means for updating a faulting page entry of said page table, said faulting page entry corresponding to said faulting page, said updating means modifying said faulting page entry so that said faulting page entry points to said copy of said faulting page and indicates that said faulting page has a "read/write" status, said updating means coupled to said building means and said copying means; and re-executing means for re-executing said step requiring said datum to be written to said portion of application storage area, said re-executing means coupled to said system memory and said building means, said re-executing means writing said datum to said copy of said faulting page in said writable area of said system memory.

14. An apparatus comprising:

a system memory;

a removable system resource coupled to a processor, said removable system resource having a program stored within an application storage area of said removable system resource;

a page maker to divide said program into a plurality of pages;

a page table builder building a page table comprising a plurality of page entries, each page entry corresponding to a page of said program;

a page entry marker marking each said page entry to indicate that said page corresponding to said page entry has a read-only status;

a program executor executing in place said program from said application storage area;

a faulting page calculator determining a faulting page of said plurality of pages;

a faulting page copier copying said faulting page to a writable area of the system memory; and a page table entry modifier updating said faulting page entry so that said faulting page entry points to said copy of said faulting page and indicates that said faulting page has a read/write status.

15. The apparatus of claim 14 wherein the faulting page calculator determines the faulting page by detecting a write error.

16. A method comprising the steps of:

storing a program in an application storage area of a removable system resource;

dividing the program into a plurality of pages;

building a page table comprising a plurality of page entries, each page entry corresponding to a page of said program;

marking each page entry to indicate that said page corresponding to said page entry has a read-only status;

executing said program from the application storage area;

determining a faulting page to a writeable area of system memory; and updating a faulting page entry such that said faulting page entry points to said copy of said faulting page and indicates that said faulting page has a read/write status.

17. The method of claim 16 wherein the writeable area of system memory is a random access memory.

18. The method of claim 16 wherein said page table includes a mapping between a page of said program and a virtual address space.

19. The method of claim 16 wherein the step of updating a faulting page entry to indicate that a faulting page has a read/write status includes the step of recording an address which corresponds to a location in the writeable area of system memory which receives said copy of said faulting page.

20. The method of claim 16 wherein the step of determining the faulting page is executed by detecting a write error.

21. The method of claim 14 wherein the writeable area of system memory is a random access memory.

\* \* \* \* \*